US012561978B2

(12) United States Patent
Huang et al.

(10) Patent No.: US 12,561,978 B2
(45) Date of Patent: Feb. 24, 2026

(54) ELECTRONIC COUNTER SCALE INTELLIGENT VERIFICATION METHOD BASED ON DEEP LEARNING DETECTION AND IDENTIFICATION

(71) Applicant: GUANGZHOU INSTITUTE OF MEASUREMENT AND TESTING TECHNOLOGY, Guangdong (CN)

(72) Inventors: Jian Huang, Guangdong (CN); Jian Ma, Guangdong (CN)

(73) Assignee: GUANGZHOU INSTITUTE OF MEASUREMENT AND TESTING TECHNOLOGY, Guangdong (CN)

( * ) Notice: Subject to any disclaimer, the term of this patent is extended or adjusted under 35 U.S.C. 154(b) by 284 days.

(21) Appl. No.: 18/391,690

(22) Filed: Dec. 21, 2023

(65) Prior Publication Data

US 2024/0282111 A1 Aug. 22, 2024

Related U.S. Application Data

(63) Continuation of application No. PCT/CN2023/121486, filed on Sep. 26, 2023.

(30) Foreign Application Priority Data

Feb. 21, 2023 (CN) .......................... 202310140271.6

(51) Int. Cl.
*G06V 20/50* (2022.01)
*G01G 23/01* (2006.01)
(Continued)

(52) U.S. Cl.
CPC ............. *G06V 20/50* (2022.01); *G01G 23/01* (2013.01); *G06T 7/74* (2017.01); *G06V 20/60* (2022.01);
(Continued)

(58) Field of Classification Search
CPC .... G06V 20/50; G06V 30/1444; G06V 30/30; G06V 30/191; G06V 30/12; G06V 20/60; G06T 7/74; G01G 23/01
See application file for complete search history.

(56) References Cited

U.S. PATENT DOCUMENTS

2011/0232972 A1 9/2011 McQueen et al.
2020/0327690 A1 10/2020 Cai et al.

FOREIGN PATENT DOCUMENTS

CN 110243452 9/2019
CN 110646080 1/2020
(Continued)

*Primary Examiner* — Wednel Cadeau
(74) *Attorney, Agent, or Firm* — JCIPRNET

(57) ABSTRACT

The present disclosure discloses an electronic counter scale intelligent verification method based on deep learning detection and identification, which includes: collecting a top image, top depth data, and a front image of the electronic counter scale, and selecting a reading display apparatus on the front image; inputting the top image into a scale pan detection and identification model to obtain a scale pan target detection result, verifying the result with the top depth data, obtaining a spatial position of a scale pan, and outputting the spatial coordinates of the four vertices of the scale pan; inputting the top image into an indicating value detection and identification model to obtain indicating value characters and a position of the display apparatus, correcting similar characters and low-confidence characters, and obtaining an indicating value of the electronic counter scale; and performing unmanned verification of weighing performance, repeatability, bias load, and discrimination.

5 Claims, 2 Drawing Sheets

Collect a top image, top depth data, and a front image of an electronic counter scale and selecting a reading display apparatus on the front image of the electronic counter scale Input the top image of the electronic counter scale into a scale pan detection and identification model to obtain a scale pan target detection result, verify the scale pan target detection result with the top depth data to obtain a spatial position of a scale pan, and output the spatial coordinates of the four vertices of the scale pan Input the top image of the electronic counter scale into an indicating value detection and identification model to obtain indicating value characters and a position of the display apparatus, correcting similar characters and low-confidence characters, and obtain an indicating value of the electronic counter scale according to arrangement of horizontal coordinates of the indicating value characters Perform unmanned verification of weighing performance, repeatability, bias load, and discrimination by controlling a three-axis mechanical arm to load weights, based on the obtained spatial position of the scale pan and the indicating value of the display apparatus

(51) Int. Cl.

| | | |
|---|---|---|
| *G06T 7/73* | (2017.01) | |
| *G06V 20/60* | (2022.01) | |
| *G06V 30/12* | (2022.01) | |
| *G06V 30/14* | (2022.01) | |
| *G06V 30/19* | (2022.01) | |
| *G06V 30/30* | (2022.01) | |

(52) U.S. Cl.
CPC .......... *G06V 30/12* (2022.01); *G06V 30/1444* (2022.01); *G06V 30/191* (2022.01); *G06V 30/30* (2022.01); *G06T 2207/10028* (2013.01); *G06T 2207/20081* (2013.01); *G06V 2201/02* (2022.01)

(56) References Cited

FOREIGN PATENT DOCUMENTS

| | | | | |
|---|---|---|---|---|
| CN | 211061041 | 7/2020 | | |
| CN | 113340393 | 9/2021 | | |
| CN | 114241197 | 3/2022 | | |
| KR | 200386330 Y1 * | 6/2005 | ............. | G01G 23/36 |
| KR | 20220029463 | 3/2022 | | |

* cited by examiner

Figure 1:
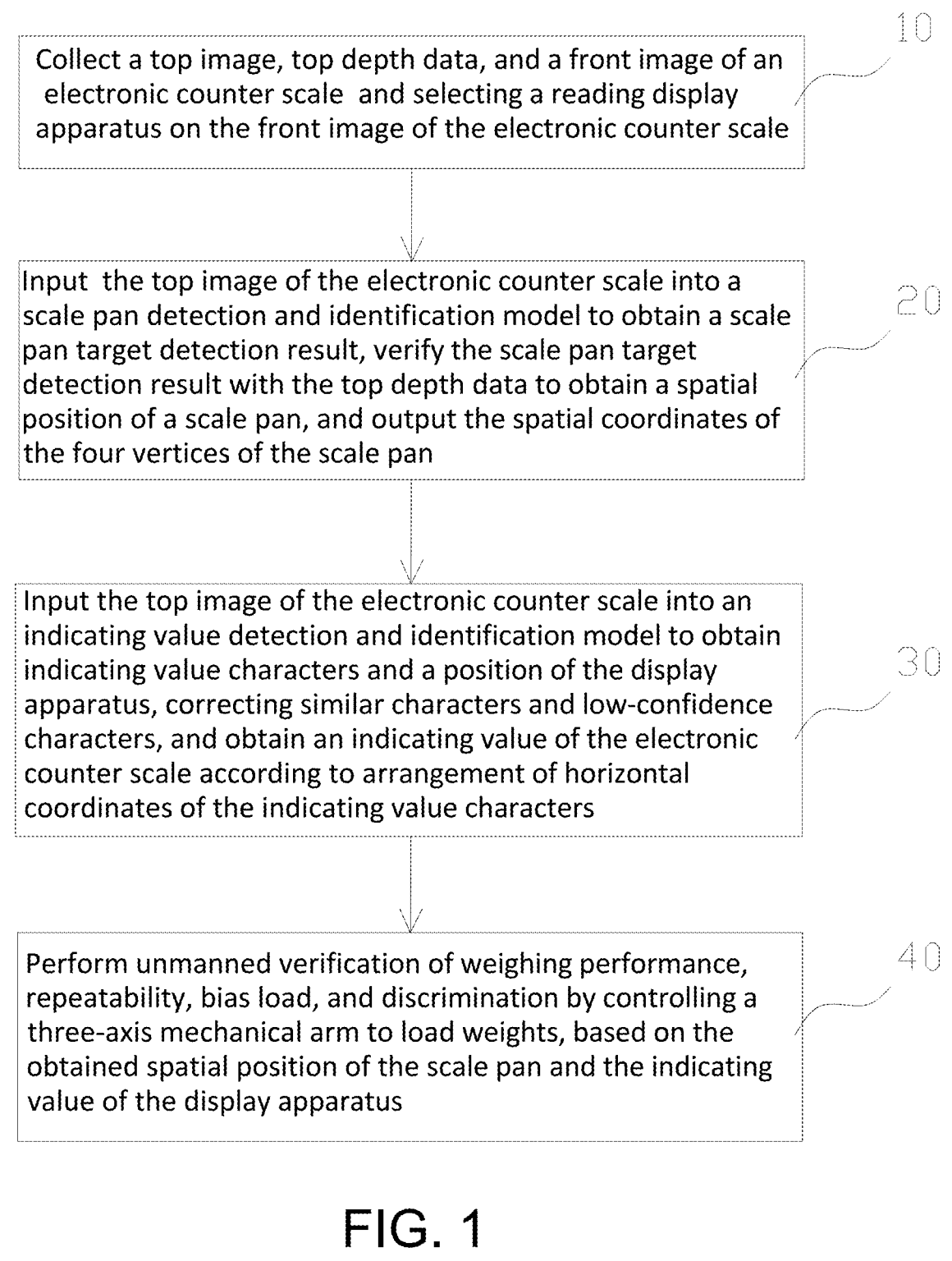

Collect a top image, top depth data, and a front image of an electronic counter scale  and selecting a reading display apparatus on the front image of the electronic counter scale

10

Input  the top image of the electronic counter scale into a scale pan detection and identification model to obtain a scale pan target detection result, verify the scale pan target detection result with the top depth data to obtain a spatial position of a scale pan, and output the spatial coordinates of the four vertices of the scale pan

20

Input the top image of the electronic counter scale into an indicating value detection and identification model to obtain indicating value characters and a position of the display apparatus, correcting similar characters and low-confidence characters, and obtain an indicating value of the electronic counter scale according to arrangement of horizontal coordinates of the indicating value characters

30

Perform unmanned verification of weighing performance, repeatability, bias load, and discrimination by controlling a three-axis mechanical arm to load weights, based on the obtained spatial position of the scale pan and the indicating value of the display apparatus

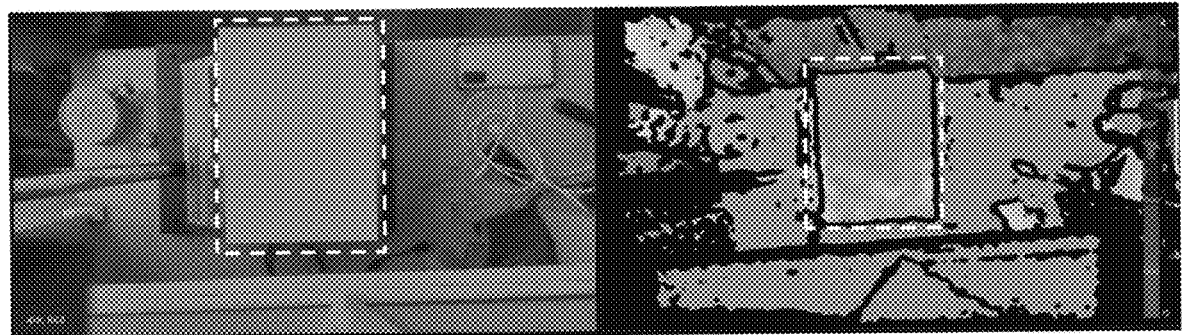
FIG. 2a                    FIG. 2b

ELECTRONIC COUNTER SCALE INTELLIGENT VERIFICATION METHOD BASED ON DEEP LEARNING DETECTION AND IDENTIFICATION

CROSS REFERENCE TO RELATED APPLICATIONS

This application is a continuation of international application of PCT application serial no. PCT/CN2023/121486 filed on Sep. 26, 2023, which claims the priority benefit of China application no. 202310140271.6 filed on Feb. 21, 2023 and entitled "Electronic Counter Scale Intelligent Verification Method Based on Deep Learning Detection and Identification". The entirety of each of the above mentioned patent applications is hereby incorporated by reference herein and made a part of this specification.

TECHNICAL FIELD

The present disclosure relates to the field of verification of electronic counter scales, in particular to an electronic counter scale intelligent verification method based on deep learning detection and identification.

BACKGROUND

Electronic scales are measuring instruments included in Metrology Law. Organizers of commodity exchange venues should fulfill the corresponding metrological management responsibility by setting up Article 42 specifically for constraint. For products with reproducible values, measuring instruments that have been verified and qualified to meet the re-inspection demands should be set up at prominent locations of the commodity exchange venues. The relevant national standards require its weighing performance, repeatability, bias load, discriminatory power and other properties, and the measuring instruments need to be verified annually, which becomes a problem of large workload of verification.

The present disclosure provides an intelligent sensing method for verifying key information of an electronic counter scale based on deep learning. By acquiring a top image and top depth data of an electronic counter scale, a scale pan detection and identification model is adopted to obtain an accurate scale pan position, and by acquiring a front image of the electronic counter scale, an indicating value detection and identification model is adopted to obtain an indicating value of the electronic counter scale; and in combination with a verification procedure and apparatus, unmanned verification of the weighing performance, repeatability, bias load and discriminatory power can be realized. The present disclosure provides an electronic counter scale intelligent verification method and apparatus based on deep learning detection and identification. The method is developed based on a deep learning target detection technology to realize intelligent sensing of key information verification of the electronic counter scale, obtain the spatial position of a scale pan and an indicating value of a display apparatus, cooperate with the verification apparatus and help to realize unmanned verification of the electronic counter scale.

SUMMARY

In order to solve the above-mentioned technical problems, the present disclosure aims to provide an electronic counter scale intelligent verification method based on deep learning detection and identification. The method is developed based on a deep learning target detection technology to realize intelligent sensing of key information verification of the electronic counter scale, obtain the spatial position of a scale pan and an indicating value of a display apparatus, cooperate with a verification apparatus and help to realize unmanned verification of the electronic counter scale.

The objective of the present disclosure is achieved by the following technical solutions:

An electronic counter scale intelligent verification method based on deep learning detection and identification, includes:

step A, collecting a top image, top depth data, and a front image of an electronic counter scale, and selecting a reading display apparatus on the front image of the electronic counter scale;

step B, inputting the top image of the electronic counter scale into a scale pan detection and identification model to obtain a scale pan target detection result, verifying the scale pan target detection result with the top depth data to obtain a spatial position of a scale pan, and outputting the spatial coordinates of the four vertices of the scale pan;

step C, inputting the top image of the electronic counter scale into an indicating value detection and identification model to obtain indicating value characters and a position of the display apparatus, correcting similar characters and low-confidence characters, and obtaining an indicating value of the electronic counter scale according to arrangement of horizontal coordinates of the indicating value characters;

step D, performing unmanned verification of weighing performance, repeatability, bias load, and discrimination by controlling a three-axis mechanical arm to load weights, based on the obtained spatial position of the scale pan and the indicating value of the display apparatus.

BRIEF DESCRIPTION OF FIGURES

FIG. 1 is a flow chart of an intelligent sensing method for verifying key information of an electronic counter scale based on deep learning; and FIG. 2*a* and FIG. 2*b* are schematic diagrams of scale pan target detection results of a scale pan detection and identification model.

DETAILED DESCRIPTION

In order to make the objectives, technical solutions and advantages of the present disclosure more clearly, the present disclosure will be described in further detail below in conjunction with embodiments and accompanying drawings.

As shown in FIG. 1, an intelligent sensing method for verifying key information of an electronic counter scale based on deep learning includes the following steps:

Step 10, verification of key information of an electronic counter scale, including a spatial position of a scale pan and an indicating value of a display apparatus, collecting a top image and top depth data of the electronic counter scale by a depth camera, collecting a front image of the electronic counter scale by a color camera, and manually selecting a reading display apparatus from the front image of the electronic counter scale.

Step 20, inputting the top image of the electronic counter scale into a scale pan detection and identification model to obtain a scale pan target detection result, verifying the scale pan target detection result with the top depth data to obtain an accurate scale pan position, and outputting the spatial coordinates of four vertices of the scale pan.

The scale pan detection and identification model is a deep learning target detection model with categories of a scale pan and a background, and the model structure may be YOLO, SSD, faster R-CNN, etc.

The scale pan target detection result is a rectangular bounding box of the scale pan on the image. The recording can be done in two ways: a top-left vertex and a length and width $(u_0, v_0, w, d)$ of the bounding box or a top-left vertex and a bottom-right vertex $(u_0, v_0, u_2, v_2)$ of the bounding box.

The verification with the top depth data is to map the rectangular bounding box of the scale pan on the image to a coordinate space of the depth data, i.e., to map the top-left vertex of the bounding box $(u_0, v_0) \rightarrow (x_0, y_0, z_0)$, and the bottom-right vertex of the bounding box $(u_1, v_1)$—$(x_1, y_1, z_1)$ respectively.

The scale pan is in a range of $(x_0, y_0) \rightarrow (x_0, y_2) \rightarrow (x_2, y_2) \rightarrow (x_1, y_0) \rightarrow (x_0, y_0)$ in a point cloud, and depth of each point in the range is followed to obtain an accurate position of the scale pan, and the spatial coordinates of the four vertices of the scale pan are output, i.e., $(X_0, Y_0, Z_0)$, $(X_1, Y_1, Z_1)$, $(X_2, Y_2, Z_2)$, and $(X_3, Y_3, Z_3)$.

As shown in FIG. 2a and FIG. 2b, the top image of the electronic counter scale (FIG. 2a) is first input into the scale pan detection and identification model to obtain a scale pan target detection result, which has a bounding box slightly larger than the scale pan; and the bounding box is [452.46, 64.79,805.03,513.26].

Verify with the top depth data to obtain the accurate position of the scale pan, and output the spatial coordinates of the four vertices of the scale pan (FIG. 2b). This is also suitable for the situation where the scale pan is placed offset.

The top-left vertex: [0.0436,−0.1128,0.581] m.

The bottom-right vertex: [0.0436,0.0286,0.581] m.

The bottom-left vertex: [−0.067,0.0286,0.581] m.

The top-right vertex: [−0.067,−0.1128,0.581] m.

Step 30, inputting the top image of the electronic counter scale into an indicating value detection and identification model to obtain indicating value characters and a position of the display apparatus. Perform the following two corrections, non-maximum suppression for similar characters and decimal point complementing for low-confidence characters. Arrange the horizontal coordinate (u) of the indicating value characters from small to large to obtain an indicating value of the electronic counter scale.

The indicating value detection and identification model is a deep learning target detection model with 21 categories of 0, 1, 2, 3, 4, 5, 6, 7, 8, 9, 0., 1., 2., 3., 4., 5., 6., 7., 8., 9., a background, etc., the model structure is faster R-CNN, etc., and the method helps to accurately recognize a decimal point.

The scale pan target detection result is the indicating value characters and the position, and two corrections are performed.

The similar characters are subjected to non-maximum suppression, which is to perform non-maximum suppression on ten pairs of similar characters such as 0-0., 1-1., etc. to prevent repeated detection.

The decimal point complementing for the low-confidence characters is a decimal point complementing operation on low-confidence character detection results, i.e., making $0 \rightarrow 0.$ and $1 \rightarrow 1.$ if the detection results have low confidence.

The horizontal coordinates (u) of the indicating value characters are arranged from small to large to obtain the indicating value of the electronic counter scale.

Step 40, performing unmanned verification of weighing performance, repeatability, bias load, and discrimination by a verification program to control a three-axis mechanical arm to load weights based on the obtained spatial position of the scale pan and the indicating value of the display apparatus and according to a verification procedure.

The verification program may obtain the spatial coordinates of the four vertices of the scale pan by adopting the method in Step 20, and thus calculating the off-loading area or center of the scale pan, and controlling the mechanical arm to place the weights.

After loading, use the method in step 30 to obtain the indicating value of the electronic counter scale.

In accordance with the requirements of the procedure, repeat Step 20 to Step 30 to complete the unmanned verification of the weighing performance, repeatability, bias load, and discrimination.

Compared with the prior art, one or more embodiments of the present disclosure may have the following advantages:

the intelligent sensing method for verifying key information of the electronic counter scale based on deep learning target detection obtains the spatial position of the scale pan and the indicating value of the display apparatus, cooperates with the verification apparatus and helps to realize unmanned verification of the electronic counter scale.

Although the disclosed implementations of the present disclosure are as above, the described contents are only used to facilitate the understanding of the present disclosure, and are not intended to limit the present disclosure. Any person skilled in the art to which the present disclosure belongs may, without departing from the spirit and scope disclosed by the present disclosure, make any modifications and changes in the form and details of the implementation, but the scope of the patent protection of the present disclosure shall still be subject to the scope defined in the appended claims.

What is claimed is:

1. An intelligent sensing method for verifying key information of an electronic counter scale based on deep learning, comprising the following steps:

step A, collecting a top image, top depth data, and a front image of the electronic counter scale, and selecting a reading display apparatus on the front image of the electronic counter scale;

step B, inputting the top image of the electronic counter scale into a scale pan detection and identification model to obtain a scale pan target detection result, verifying the scale pan target detection result with the top depth data to obtain a spatial position of a scale pan, and outputting the spatial coordinates of the four vertices of the scale pan;

step C, inputting the top image of the electronic counter scale into an indicating value detection and identification model to obtain indicating value characters and a position of the display apparatus, correcting similar characters and low-confidence characters, and obtaining an indicating value of the electronic counter scale according to arrangement of horizontal coordinates of the indicating value characters; and step D, performing unmanned verification of weighing performance, repeatability, bias load, and discrimination by controlling a three-axis mechanical arm to load weights, based on the obtained spatial position of the scale pan and the indicating value of the electronic counter scale.

2. The intelligent sensing method for verifying key information of the electronic counter scale based on deep learning according to claim 1, wherein in the step A, the top image and the top depth data of the electronic counter scale are collected by a depth camera; and the front image of the electronic counter scale is collected by a color camera.

3. The intelligent sensing method for verifying key information of the electronic counter scale based on deep learning according to claim 1, wherein in the step B, the scale pan detection and identification model is a deep learning target detection model;

the scale pan target detection result is a rectangular bounding box of the scale pan on the image, and the recording can be done in two ways: a top-left vertex and a length and width $(u_0, v_0, w, d)$ of the bounding box or a top-left vertex and a bottom-right vertex $(u_0, v_0, u_2, v_2)$ of the bounding box;

the verification with the top depth data is to map the rectangular bounding box of the scale pan on the image to a coordinate space of the depth data, i.e., to map the top-left vertex of the bounding box $(u_0, v_0) \rightarrow (x_0, y_0, z_0)$, and the bottom-right vertex of the bounding box $(u_1, v_1) \rightarrow (x_1, y_1, z_1)$; and the scale pan is in a range of $(x_0, y_0) \rightarrow (x_0, y_2) \rightarrow (x_2, y_2) \rightarrow (x_1, y_0) \rightarrow (x_0, y_0)$ in a point cloud, and depth of each point in the range is followed to obtain an accurate position of the scale pan, and output the spatial coordinates of the four vertices of the scale pan, i.e., $(X_0, Y_0, Z_0)$, $(X_1, Y_1, Z_1)$, $(X_2, Y_2, Z_2)$, and $(X_3, Y_3, Z_3)$.

4. The intelligent sensing method for verifying key information of the electronic counter scale based on deep learning according to claim 1, wherein in the step C, the indicating value detection and identification model is a deep learning target detection model;

the scale pan target detection result is the indicating value characters and the position;

the corrections include non-maximum suppression correction for the similar characters and decimal point complementing correction for the low-confidence characters, the non-maximum suppression correction for the similar characters is to perform a non-maximum suppression on the similar characters; the decimal point complementing correction for the low-confidence characters is to perform a decimal point complementing operation on the character detection results with low confidence, i.e., making $0 \rightarrow 0$, and $1 \rightarrow 1$ if the detection results have low confidence; and the horizontal coordinates of the indicating value characters are arranged from small to large.

5. The intelligent sensing method for verifying key information of the electronic counter scale based on deep learning according to claim 1, wherein in the step D, the spatial coordinates of the four vertices of the scale pan are obtained through a verification program, and thus calculating an off-loading area or center of the scale pan, and controlling the mechanical arm to place the weights.

* * * * *